Jan. 15, 1924. 1,480,984
R. BELL
APPARATUS FOR AND METHOD OF REDUCING BOILED VEGETABLES TO MASHED FORM
Filed Jan. 24, 1923
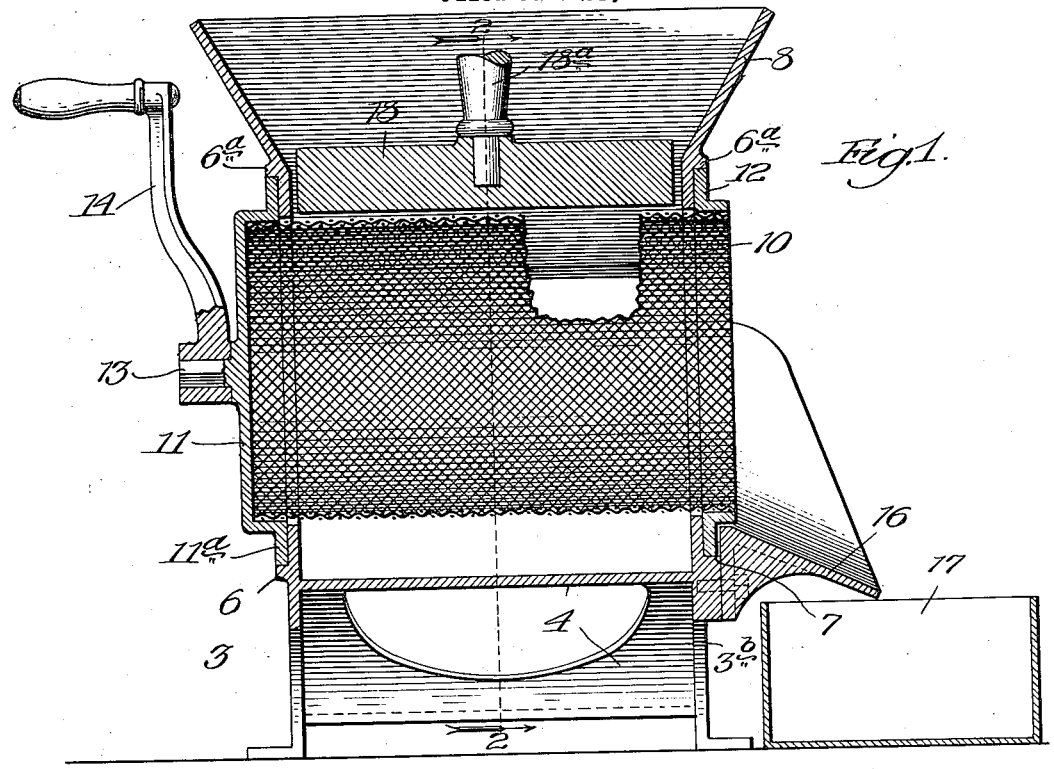
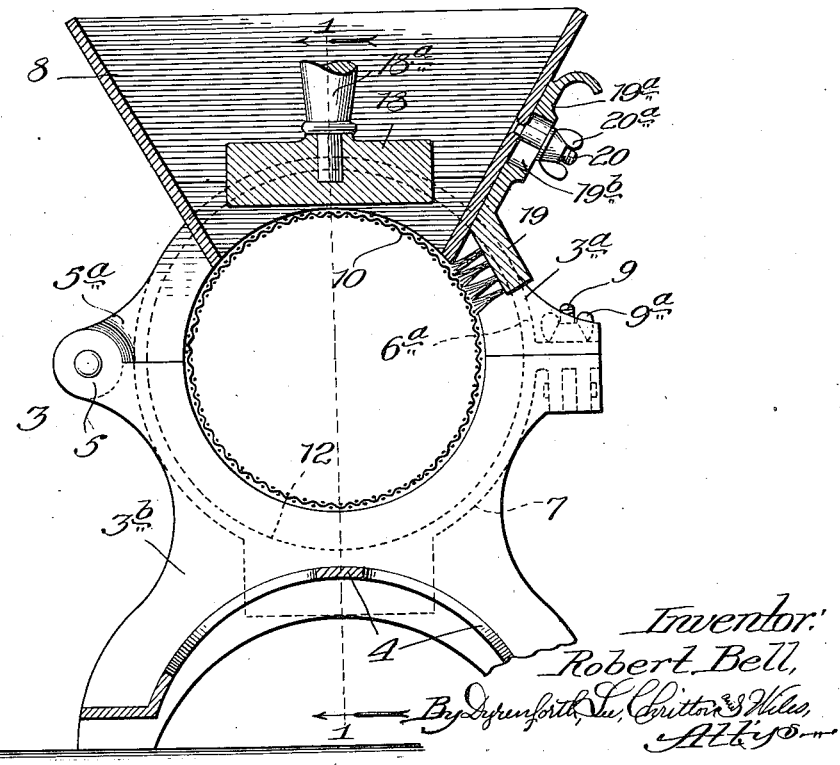
Inventor:
Robert Bell, Patented Jan. 15, 1924.

1,480,984

UNITED STATES PATENT OFFICE.

ROBERT BELL, OF CHICAGO, ILLINOIS.

APPARATUS FOR AND METHOD OF REDUCING BOILED VEGETABLES TO MASHED FORM.

Application filed January 24, 1923. Serial No. 614,585.

*To all whom it may concern:*

Be it known that I, ROBERT BELL, a citizen of the United States, residing at Chicago, in the county of Cook and State of Illinois, have invented a new and useful Improvement in Apparatus for and Methods of Reducing Boiled Vegetables to Mashed Form, of which the following is a specification.

The primary object of my invention is to provide a simple construction of apparatus for so operating on cooked vegetables, and more particularly boiled potatoes, as to reduce them to a mashed condition devoid of lumps and smooth throughout the resultant mass, and which will operate, when the vegetables treated have not had their skins removed, or have their jackets on as in the case of potatoes, to disintegrate them without mixing the ground product thereof or fibrous matter removed therewith with the mass of pulp; thereby to easily and quickly prepare the vegetable in mashed form, ready to be served, without resorting for the purpose to the ordinary and arduous practice of peeling and mashing by hand.

It may be stated at the outset that my improved apparatus is distinguished from known apparatus for preparing potatoes and other vegetables by feeding them between a pair, or successive pairs of perforated rotatory sheet-metal cylinders, whereby the vegetables are squashed and passed in that condition through the perforations in riced or stringy and lumpy, as distinguished from a smooth mashed condition; or from other known apparatus for the purpose by which boiled vegetables are fed against a wire-cloth surface about an imperforate rotary cylinder and presenting undulatory sharp cutting edges whereby the vegetables are ground into a pulpous mass to be shedded from the grinding surface.

My improved apparatus comprises, as its essential feature, a rotatably supported hollow cylinder of fine-mesh wire cloth, preferably of about $\frac{1}{16}$ to $\frac{1}{8}$ inch mesh, to which the preparatorily boiled vegetables are fed, under pressure, while the cylinder is being rotated.

In the accompanying drawings—

Figure 1 shows the apparatus by a longitudinal vertical section on line 1—1, Fig. 2; and Figure 2 is a broken sectional view taken on line 2—2, Fig. 1.

The frame 3 is preferably of metal and cast in two, upper and lower, sections 3ª and 3ᵇ. The similar opposite sides of the lower section, which are connected by a web 4, have semicircularly concave upper ends and corresponding perforate corner-ears 5 and external shoulder-forming flanges 6 and 7 conforming to the concave ends. The upper frame-section has its opposite sides cast integral with the hopper 8, from one side of which perforate corner-ears 5ª extend to respectively register with the ears on the lower section for hinging together the two sections; the lower ends of the upper frame-section being semicircularly concave to form a circular opening through the frame when the upper section is in the lowered position illustrated, wherein it is releasably fastened by bolts 9 and wing-nuts 9ª at the side of the frame opposite the hinges. Shoulder-forming flanges 6ª are formed on the external surfaces of the opposite sides of the upper frame-section 3ª and are of semicircular concave shape like the shoulders 6 and 7. The wire-cloth cylinder 10 which is of fine mesh, preferably of about $\frac{1}{16}$ to $\frac{1}{8}$ inch, extends through the frame-opening to be rotatably supported at its ends in the opposite frame-sides by a head 11 on one end, provided with a circumferential flange 11ª fitting between the frame-flanges 6 and 6ª, the opposite end of the cylinder being open, for its discharge, and carried by a collar 12, of angular cross-section, fitting between the frame-flanges 7 and 6ª. A stud 13, of rectangular cross-section, projects centrally from the outer face of the head 11 for application thereto of a winch 14 to rotate the cylinder in its bearings. To the side of the frame carrying the open end of the cylinder is secured a spout 16 for directing the matter discharged from the cylinder into a suitable receptacle, shown to be provided at 17 in Fig. 1. A follower-block 18, which may be formed of wood or metal and has a handle 18ª, is provided for use in the hopper in operating the apparatus as hereinafter described.

A suitable brush 19 is adjustably supported to extend between the opposite frame-sides, on an outer face of the hopper, as by a bolt 20 extending from the hopper through an elongated slot 19ᵇ in the brush-handle 19ª, a wing-nut 20ª being shown on the bolt for securing the brush in its one position of bearing against the outer cylinder-surface and in its withdrawn position when out of use.

Having especially devised my apparatus for use on boiled potatoes, the following description is confined to its operation thereon, though it is to be understood that it operates equally as well on other boiled vegetables, such as turnips, squash, carrots and the like, to be served in mashed form.

The boiled potatoes are filled into the hopper and the cylinder is rotated, while the operator bears with one hand on the follower-plate imposed on the heap of potatoes in the hopper. By the action of the rotating cylinder, under the more or less slight pressure exerted on or by the potatoes, the latter are disintegrated and the pulp passes through the wire-cloth into the interior of the cylinder and accumulates therein in mashed form to discharge by way of the spout 16 into the receptacle 17. Any lumps in the disintegrated material, such as are produced by scorched or diseased portions of the potatoes, and tough parts such as eyes left in them, and other fibrous parts, as also the jackets, which when the potatoes are fed with their jackets on are ground up by the cylinder action, are intercepted in the mesh and thus prevented from passing into the cylinder with the pulp, which is thus produced in a smooth condition wholly devoid of lumps, and in the form of mashed potatoes.

The brush serves to keep the cylinder clear of the matter intercepted in the mesh, but may be adjusted to hold it out of contact with the cylinder when not required to be used. As will be seen, the construction enables the cylinder to be readily withdrawn from the frame, as for cleaning it.

I realize that considerable variation is possible in the details of construction herein shown and described and I do not intend to limit my invention thereto except as pointed out in the appended claims, in which it is my intention to claim all the novelty inherent in my invention as broadly as permissible by the state of the art.

I claim:

1. Apparatus for reducing cooked vegetables to mashed form, comprising a movably supported hollow cylinder having an unobstructed discharge end and formed from rounded wire-cloth having a substantially uniform vegetable mashing surface and presenting no sharp surfaces and of such fineness as to prevent the passing therethrough of particles of the peeling, eyes, or other unedible substances of the vegetables under treatment, the interior of said cylinder forming a receptacle for the edible portions of the vegetables, and means for feeding under pressure the boiled vegetables against the surface of said cylinder to reduce them to the smooth consistency of ordinary mashed potatoes and to pass the resultant product into the cylinder to accumulate therein in said form.

2. Apparatus for reducing cooked vegetables to mashed form, comprising a movably supported hollow cylinder having an unobstructed discharge end and formed from rounded wire-cloth having a substantially uniform vegetable mashing surface and presenting no sharp surfaces and of such fineness as to prevent the passing therethrough of particles of the peeling, eyes, or other unedible substances of the vegetables under treatment, the interior of said cylinder forming a receptacle for the edible portions of the vegetables, and means for feeding under pressure the boiled vegetables against the surface of said cylinder to reduce them to the smooth consistency of ordinary mashed potatoes and to pass the resultant product into the cylinder to accumulate therein in said form, a spout adjacent the open end of the cylinder and a brush bearing against the cylinder surface and operating to remove therefrom adhering refuse matter removed from the vegetables by the operation.

3. The method of reducing cooked vegetables to smooth, mashed condition substantially free from lumps, particles of the peeling, or other objectionable substances, which consists in bringing such vegetables under pressure into contact with a movable surface of rounded wire-cloth of such fineness as to permit the passing therethrough and the accumulation of the edible portion only of the vegetables on one side of said surface and to mash such portion to a smooth compact mass while retaining the peelings and other unedible portions of the vegetables on the opposite side of such surface.

ROBERT BELL.